United States Patent
Seo (10) Patent No.: US 12,254,506 B2
(45) Date of Patent: Mar. 18, 2025

(54) APPARATUS AND METHOD FOR GENERATING POSITIONING INDICATOR

(71) Applicants: Hyundai Motor Company, Seoul (KR); Kia Corporation, Seoul (KR)

(72) Inventor: DaeKwan Seo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/893,472

(22) Filed: Aug. 23, 2022

(65) Prior Publication Data

US 2023/0274336 A1    Aug. 31, 2023

(30) Foreign Application Priority Data

Feb. 25, 2022 (KR) .................. 10-2022-0024946

(51) Int. Cl.
G06Q 30/00 (2023.01)
G06Q 30/0601 (2023.01)
G06Q 50/00 (2012.01)

(52) U.S. Cl.
CPC ..... *G06Q 30/0639* (2013.01); *G06Q 30/0629* (2013.01); *G06Q 50/01* (2013.01)

(58) Field of Classification Search
None
See application file for complete search history.

(56) References Cited

U.S. PATENT DOCUMENTS

2014/0379428 A1* 12/2014 Phansalkar ........... H04L 67/535
                                                    705/7.32
2017/0148035 A1*  5/2017 Yadagiri ............ G06Q 30/0201

* cited by examiner

*Primary Examiner* — Mila Airapetian
(74) *Attorney, Agent, or Firm* — Fox Rothschild LLP (57) ABSTRACT

A positioning index generating apparatus configured to collect data generated by an action of a customer in each of a plurality of steps into which a product purchase decision step is divided and configured to determine a positioning index of a product based on data generated in at least one step among the plurality of steps.

18 Claims, 11 Drawing Sheets

| Reference vehicle model | Competing vehicle model | Overlap rate of reference vehicle | Overlap rate of competing vehicle | Competing vehicle share in competing vehicle grade |
|---|---|---|---|---|
| A2 | B2 | 17.90% | 3.46% | 5.21% |
|  | C2 | 8.00% | 1.72% | 4.70% |
|  | D2 | 4.30% | 0.68% | 6.41% |
|  | E2 | 7.10% | 0.77% | 9.23% |
|  | F2 | 4.80% | 1.94% | 2.49% |
|  | G2 | 19.20% | 2.24% | 8.62% |
|  | H2 | 5.10% | 1.71% | 3.00% |
| B2 | C2 | 6.40% | 7.10% | 4.70% |
|  | D2 | 5.10% | 4.15% | 6.41% |
|  | E2 | 10.40% | 5.87% | 9.23% |
|  | F2 | 1.80% | 3.76% | 2.49% |
|  | A2 | 3.40% | 17.59% | 1.01% |
|  | G2 | 14.20% | 8.59% | 8.62% |
|  | H2 | 5.60% | 9.72% | 3.00% |

610 — A2 rows
620 — B2 rows

FIG. 7

| | B2 | C2 | D2 | E2 | F2 | A2 | G2 | H2 |
|---|---|---|---|---|---|---|---|---|
| B2 | 0.0% | 7.50% | 4.20% | 5.90% | 3.70% | 17.90% | 8.80% | 9.90% |
| C2 | 6.40% | 0.00% | 4.30% | 4.30% | 12.10% | 8.00% | 5.00% | 10.80% |
| D2 | 5.10% | 6.20% | 0.00% | 9.50% | 3.00% | 4.30% | 4.20% | 5.20% |
| E2 | 10.40% | 8.90% | 13.60% | 0.00% | 5.10% | 7.10% | 11.50% | 9.10% |
| F2 | 1.80% | 6.90% | 1.20% | 1.40% | 0.00% | 4.80% | 1.50% | 5.00% |
| A2 | 3.40% | 1.80% | 0.70% | 0.80% | 1.80% | 0.00% | 2.20% | 1.70% |
| G2 | 14.20% | 9.50% | 5.60% | 10.60% | 5.10% | 19.20% | 0.00% | 13.40% |
| H2 | 5.60% | 7.20% | 2.40% | 2.90% | 5.80% | 5.10% | 4.70% | 0.00% |
| Sum | 46.90% | 48.00% | 32.00% | 35.40% | 36.60% | 66.40% | 37.90% | 55.10% |

710

Apply page rank algorithm

720

| Vehicle model | B2 | C2 | D2 | E2 | F2 | A2 | G2 | H2 |
|---|---|---|---|---|---|---|---|---|
| PR value | 1.176 | 1.054 | 0.984 | 1.498 | 0.539 | 0.421 | 1.496 | 0.828 |
| Percentage | 14.7% | 13.2% | 12.3% | 18.7% | 6.7% | 5.3% | 18.7% | 10.4% |

730

Purchase intention index

APPARATUS AND METHOD FOR GENERATING POSITIONING INDICATOR

CROSS-REFERENCE TO RELATED APPLICATION(S)

This application claims, under 35 U.S.C. § 119(a), the benefit of Korean Patent Application No. 10-2022-0024946 filed in the Korean Intellectual Property Office on Feb. 25, 2022, the disclosure of which is incorporated herein by reference in its entirety.

BACKGROUND

Technical Field

Embodiments of the present disclosure relate to an apparatus and method for generating a positioning index of a product or brand.

Description of the Related Art

Brand positioning means making a plan so that customers can recognize a core value of a brand and get a favorable and strong impression, by establishing a unique position of the brand in the minds of customers in a target market.

In general, a quantitative research method, through a research design, is mostly used for a positioning measurement of a brand or a product of a company in a market. In this traditional survey method, the number of research samples may be small, and answers from survey participants are limited or biased in a direction depending on the research design.

In addition to the traditional research method, a method for deriving a quantitative value after collecting contents posted online by customers or media, and applying a big data analysis technique (text mining, etc.) to the collected contents, is also being used. Since such big data analysis method is mainly a ranking method based on a simple counting of the number of times, it may not be possible to numerically reflect the influence of mutual competition relationship on all competitors in the target market.

The above information disclosed in this Background section is only for enhancement of understanding of the background of the present disclosure, and therefore it may contain information that does not form the existing technologies that may be already known in this country to a person of ordinary skill in the art.

SUMMARY

Some embodiments may provide a positioning index generating apparatus and method configured to accurately measure a position of a product or brand.

According to some embodiments, a method of generating a positioning index may be provided. The method may comprise collecting data generated by an action of a customer in each of a plurality of steps into which a product purchase decision step is divided, and determining a positioning index of a product based on data generated in at least one step among the plurality of steps.

In some embodiments, the method may further comprise, based on the positioning indices of a plurality of products belonging to one brand, determining a positioning index of the brand.

In some embodiments, the data generated in the at least one step may comprise data generated by an action of an attracted customer group of the product and data generated by an action of an interested customer group of the product, and the positioning index may comprise an awareness index.

In some embodiments, the data generated in the at least one step may comprise a digital media index of the product and product comparison data for the product. The digital media index may comprise one or more of the following: a search index; a news index of the product; and a social media index of the product, and the positioning index may comprise an awareness index.

In some embodiments, the product comparison data may comprise a number of comparisons or a comparison rate between the product and each of one or more competing products during a predetermined period. Determining the positioning index may comprise determining a weight of the product based on the product comparison data, and the method may further comprise determining a vertical media index of the product based on the weight of the product.

In some embodiments, determining the weight of the product may further comprise determining the weight of the product based on the number of comparisons or the comparison rate through a social network analysis technique.

In some embodiments, determining the positioning index may further comprise calculating a correlation coefficient between an actual sales volume of the product and each of a plurality of indices comprising the digital media index and the vertical media index, setting a weight of each of the plurality of indices based on the correlation coefficient, and determining the awareness index of the product based on a weighted sum of the plurality of indices calculated based on the weight.

In some embodiments, setting the weight may comprise setting the weight of each of the plurality of indices by normalizing the correlation coefficient of each of the plurality of indices.

In some embodiments, determining the awareness index of the product may comprise normalizing the awareness index of the product so that a sum of the awareness index of the product and awareness indices of a plurality of competing products becomes one.

In some embodiments, the data generated in the at least one step may comprise data generated by an action of a purchase-intended customer group of the product, and the positioning index may comprise a purchase intention index.

In some embodiments, the data generated in the at least one step may comprise sales clue data generated from an action of leaving contactable information by the purchase-intended customer group of the product. Determining the positioning index may comprise calculating a concurrence rate of the product and a competing product from the sales clue data, and determining the purchase intention index of the product based on the concurrence rate.

In some embodiments, the concurrence rate may comprise at least one of a rate of overlapping comparison of the product with the competing product, a rate of overlapping comparison of the competing product with the product, or an occupation rate of the sales clue data of the competing product in sales clue data of a plurality of products of a same grade among the sales clue data.

In some embodiments, determining the purchase intention index may comprise determining the purchase intention index based on the concurrence rate through a social network analysis technique.

In some embodiments, determining the purchase intention index may comprise determining a social network value of the product based on the concurrence rate through the social network analysis technique, determining a social network value of the competing product through the social network analysis technique, and determining the purchase intention index based on an occupation rate of the social network value of the product in the social network value of the product and the social network value of the competing product.

In some embodiments, the data generated in the at least one step may comprise first data generated by an action of a customer group in a first step, and second data generated by an action of a customer group in a second step different from the first step. The positioning index may comprise a first index generated based on the first data and a second index generated based on the second data.

According to some embodiments, an apparatus for generating a positioning index comprising a memory configured to store one or more instructions and a processor configured to execute the one or more instructions may be provided. The processor may, by executing the one or more instructions, collect data generated by an action of a customer group in each step of a product purchase decision, and determine a positioning index based on at least some data of the collected data.

According to some embodiments, a computer program executed by a computing device and stored on a non-transitory storage medium may be provided. The computer program may cause the computing device to execute collecting data generated by an action of a customer in each of the plurality of steps into which a product purchase decision step is divided, and determining a positioning index based on data generated in at least one step of the plurality of steps.

DETAILED DESCRIPTION OF THE EMBODIMENTS

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

An expression such as "first" and "second" indicate various constituent elements regardless of order and/or importance, is used for distinguishing a constituent element from another constituent element, and does not limit corresponding constituent elements. For example, a first constituent element may be referred to as a second constituent element without deviating from the scope described in the present specification, and similarly, a second constituent element may be referred to as a first constituent element.

An expression such as "have," "comprise," or "include" indicates existence of a corresponding feature (e.g., constituent elements such as a numerical value, function, operation, or component) and does not exclude the presence of another feature.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 1:
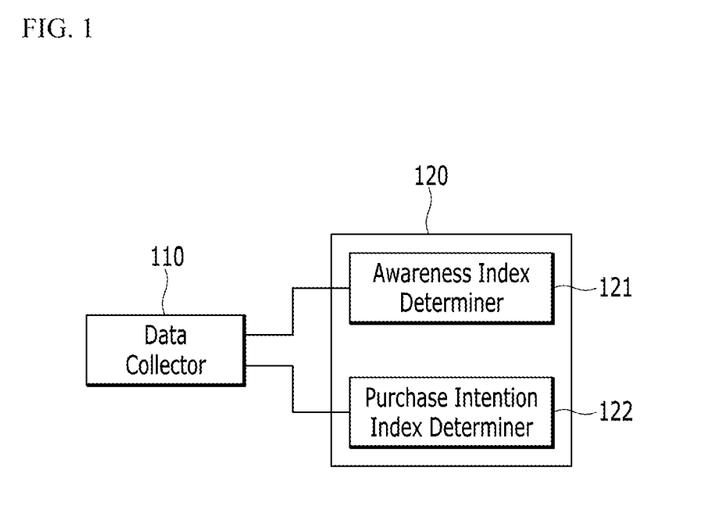
FIG. 1 is a diagram illustrating a positioning index generating apparatus according to an exemplary embodiment.
Figure 2:
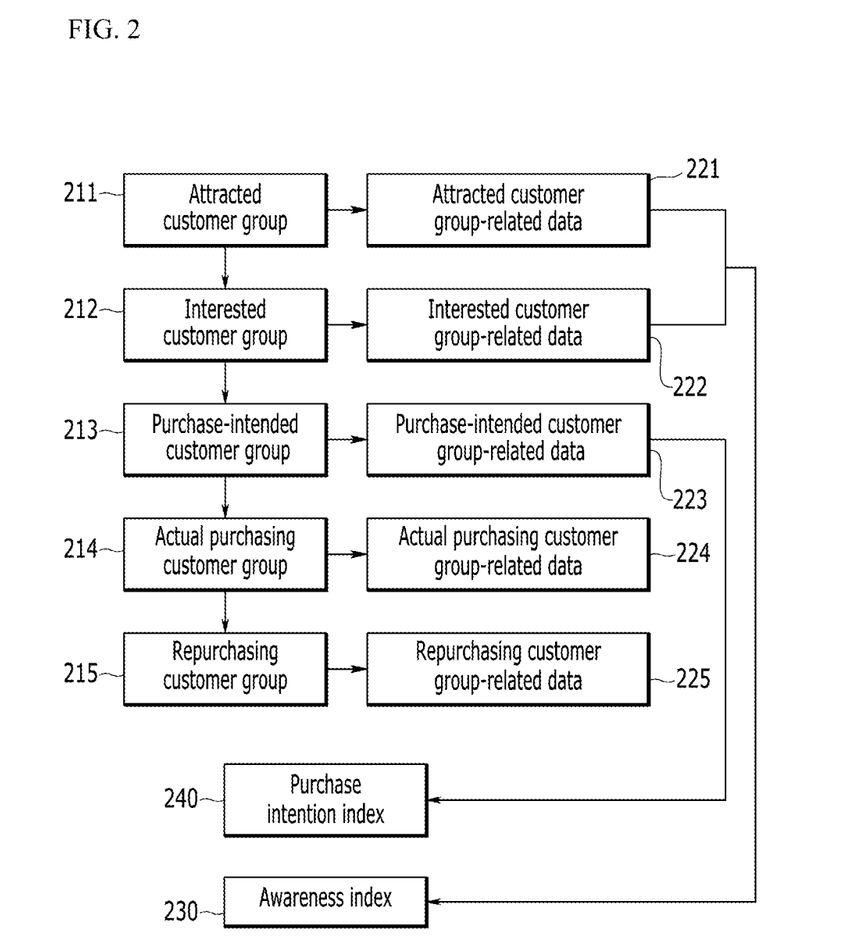
FIG. 2 is a diagram illustrating data collection at each step by a positioning index generating apparatus according to an exemplary embodiment.

FIG. 1 is a diagram illustrating a positioning index generating apparatus according to an exemplary embodiment, and FIG. 2 is a diagram illustrating data collection at each step by a positioning index generating apparatus according to an exemplary embodiment.

Referring to FIG. 1, a positioning index generating apparatus comprises a data collector 110 and an index determiner 121.

The data collector 110 collects data generated through an action of a customer. In some embodiments, the data collector 110 may be configured to collect data generated in each step of a product purchase decision by a customer. In addition, the data collector 110 collects actual sales volume data of the product.

In some embodiments, as shown in FIG. 2, a step of a product purchase decision may be divided into a step 211 of recognizing a specific product/brand, a step 212 of checking detailed information and comparing the product/brand with a competing product, a step 213 of actively identifying a purchase condition for a purchase, a step 214 of completing purchase after making a purchase decision, and a step 215 of purchasing additionally/alternatively another product while possessing a product from the same brand. A customer group in step 211 that recognizes the specific product/brand may be referred to as an attracted customer group, a customer group in step 212 that checks detailed information and compares the product/brand with a competing product may be referred to as an interested customer group, and a customer group in step 213 that actively examines a purchase condition for a purchase may be referred to as a purchase-intended customer group. Further, a customer group in step 214 that has completed purchasing after making a purchase decision may be referred to as an actual purchasing customer group, and a customer group in step 215 that purchases additionally/alternatively other product while possessing a product from the same brand may be referred to as a repurchasing customer group.

In some embodiments, the data collector 110 may be configured to collect data generated by an action of recognizing a specific product/brand, such as searching by product/brand name or visiting a representative webpage, as attracted customer group-related data 221. The data collector 110 may be configured to collect data generated by an action of visiting a webpage for checking detailed information of a product or comparing with a competing product, as interested customer group-related data 222. For example, when the product is a vehicle, the data collector 110 may be configured to collect, as attracted customer group-related data 222, data generated by an action of visiting a webpage for checking vehicle specification options, checking reviews of the vehicle, comparing with other vehicles, checking information on dealers of the vehicle, visiting an online shop, visiting a webpage for identifying an estimate or an actual purchase price, and the like. The data collector 110 may be configured to collect data generated from an act of actively identifying the purchase condition to purchase a product, for example, an act of actively leaving contact information through an online order or an inquiry about purchase over the phone, as purchase-intended customer group-related data 223. The data collector 110 may be configured to collect data generated during actual purchase as actual purchasing customer group-related data 224. The data collector 110 may be configured to collect data generated while a customer with past purchase history purchases the same brand, as repurchasing customer group-related data 225.

The index determiner 120 determines a positioning index of the product or brand, based on the actual sales volume data and some of the data generated at each step of the product purchase decision by a customer. In some embodiments, the positioning index may comprise an awareness index 230 for measuring level of interest and attention, and a purchase intent index 240 for measuring a level of purchase intention. The awareness index 230 is an index indicating a degree of interest or response of a potential customer for the product before purchasing the product, and the purchase intention index 240 is an index indicating the customer's interest at a stage just before purchasing.

In some embodiments, the index determiner 120 may comprise an awareness index determiner 121 and a purchase intention index determiner 122. The awareness index determiner 121 determines the awareness index 230 based on some data of the data collected by the data collector 110. In some embodiments, the awareness index determiner 121 may be configured to determine the awareness index 230 based on the attracted customer group-related data 221 and the interested customer group-related data 222. The purchase intention index determiner 122 determines the purchase intention index 240 based on some data of the data collected by the data collector 110. In some embodiments, the purchase intention index determiner 122 may be configured to determine the purchase intention index based on the purchase-intended customer group-related data 223.

Figure 3:
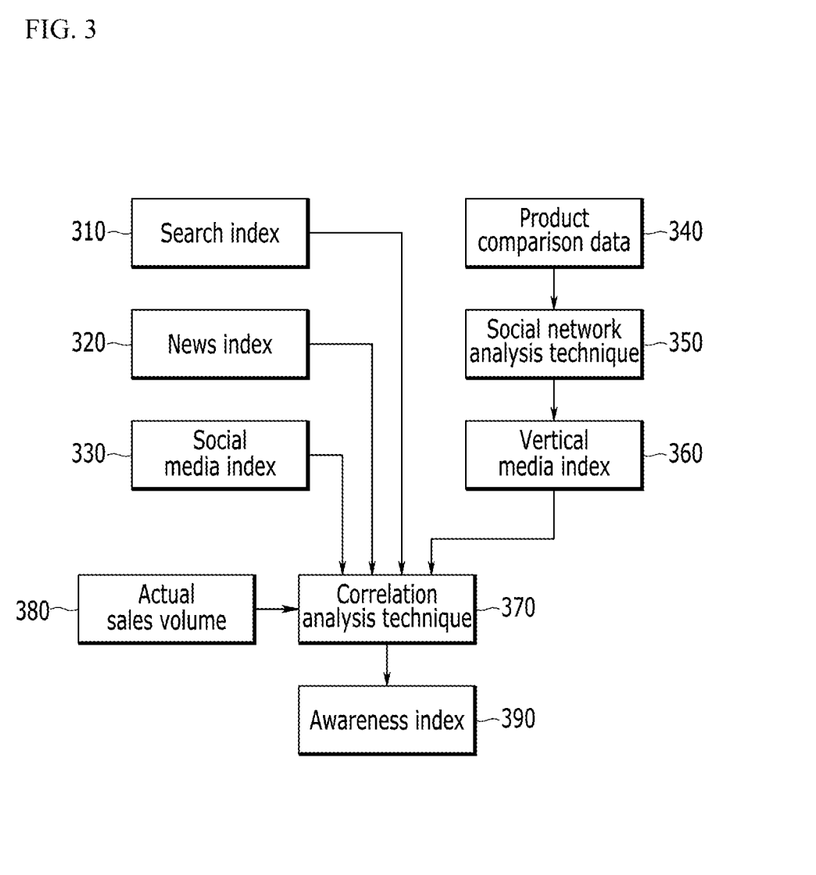
FIG. 3 is a diagram illustrating a process of determining an awareness index according to an exemplary embodiment.
Figure 4:
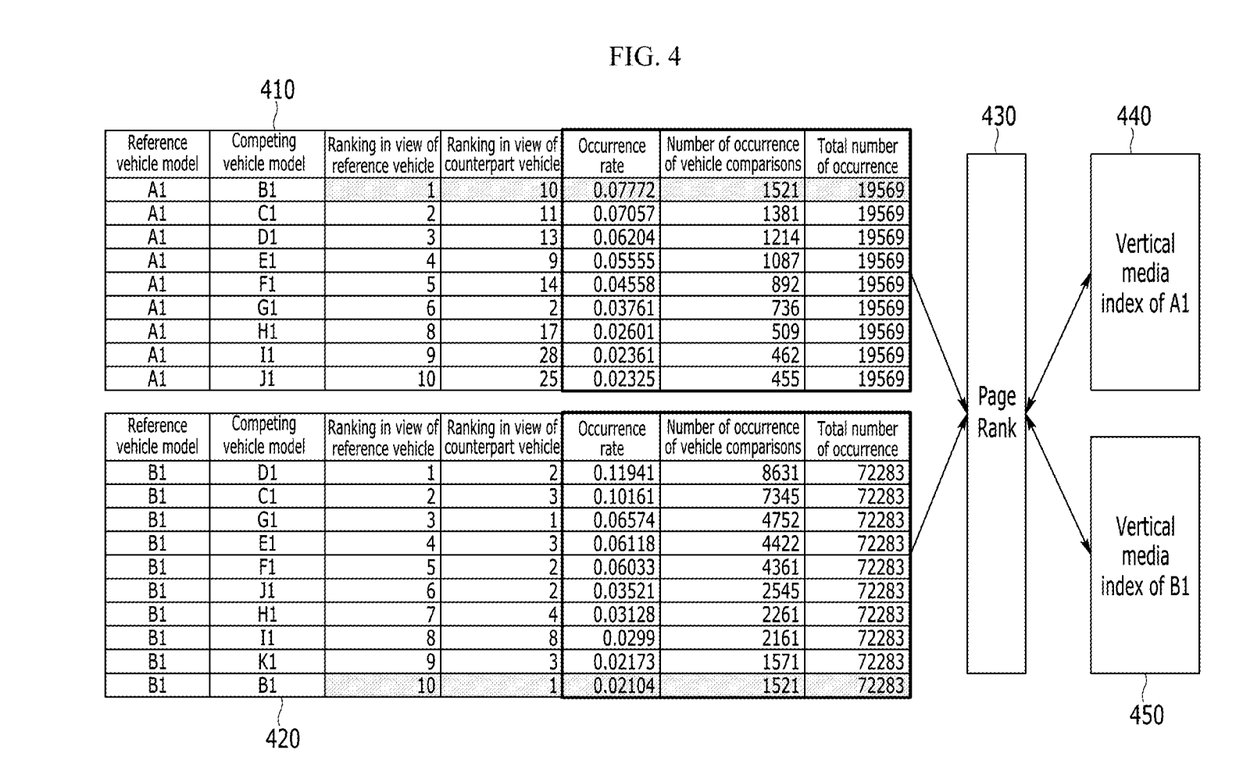
FIG. 4 is a diagram illustrating product comparison data used in a process of determining an awareness index shown in FIG. 3.

FIG. 3 is a diagram illustrating a process of determining an awareness index according to an exemplary embodiment, FIG. 4 is a diagram illustrating product comparison data used in a process of determining an awareness index shown in FIG. 3.

Referring to FIG. 3, an awareness index determiner (e.g., 121 of FIG. 1) may be configured to use indices provided by various digital media as attracted customer group-related data and interested customer group-related data. The indices provided by various digital media may comprise a search index 310, a news index 320, and/or a social media index 330.

The awareness index determiner may be configured to collect the search index 310 related to a product or brand from a search portal site. The awareness index determiner may be configured to collect the news index 320 related to a product or brand from an online news contents providing site. The awareness index determiner may be configured to collect the social media index 330 related to a product or brand from a service for providing personal messaging platform or a social media service.

In addition, the awareness index determiner may be configured to use a vertical media index 360 as the interested customer group-related data. The awareness index determiner collects product comparison data 340 from a service capable of comparing information of various products. The product comparison data 340 is data representing the number or rate of comparisons of products simultaneously compared by a same customer for a predetermined period. The awareness index determiner may be configured to calculate a weight representing influence of a product based on the product comparison data 340 through a social network analysis technique 350, and generate the vertical media index 360 based on the weight. In some embodiments, the awareness index determiner may be configured to determine the weight of a reference product by applying a page rank algorithm to the product comparison data 340 with the social network analysis technique 350, and determine the weight as the vertical media index 360. The page rank algorithm is an algorithm that extracts an influence index between networks. In some embodiments, the awareness index determiner may be configured to determine the vertical media index 360 of a competing product through the same process. In some embodiments, other algorithms used for network analysis other than the page rank algorithm may be used as the social network analysis technique 350.

The product comparison data 340 may comprise, for example, the total number of occurrences of product comparison, and the number and rate of occurrences of comparison of the reference product, as shown in FIG. 4. The number of occurrences of comparison of the reference product indicates the number of occurrences of comparisons (the number of comparisons) between the reference product and the competing product during a predetermined period, and the occurrence rate represents a ratio (comparison rate) of the number of occurrences of comparisons with the reference product to the total number of occurrences. An example shown in FIG. 4 shows data obtained through customers' simultaneous comparisons of a reference vehicle (e.g., A1) with competing vehicle models (e.g., B1, C1, D1, E1, F1, G1, H1, I1, J1, K1, . . . ). Accordingly, the awareness index determiner may be configured to determine the vertical media index 440 of the reference product A1 by considering, on the whole, a comparison network between the reference product A1 and other competing products. In some embodiments, the awareness index determiner may be configured to determine an index indicating influence of the reference product A1 (i.e., vertical media index) 440, by applying the social network analysis technique 430 to comparison data 410 of the reference product with other competing products and comparison data 420 of each competing product (e.g., B1) with other competing products. Also, the awareness index determiner may be configured to determine an index 450 (i.e., vertical media index) indicating influence of each competing products.

Referring again to FIG. 3, the awareness index determiner calculates, through a correlation analysis technique 370, a correlation coefficient between each of the search index 310, news index 320, social media index 330, and vertical media index 360 and an actual sales volume 380 of the corresponding product or brand during the same period as a collection period of those indices. Further, the awareness index determiner sets a weight for each index based on the calculated correlation coefficient. The correlation analysis technique 370 is an analysis technique that quantifies how much change behaviors of two values to be compared are similar. As the actual sales volume is similar to the change behavior, the awareness index determiner can output a higher correlation coefficient. For example, the correlation coefficient may be determined based on an arithmetic distance between a statistical value of each index and a statistical value of the actual sales volume.

The awareness index determiner may be configured to determine the weight of each index based on the correlation coefficient of each index, and determine the awareness index 390 based on a weighted average of the search index 310, the news index 320, the social media index 330, and vertical media index 360. In some embodiments, the awareness index determiner may be configured to determine the awareness index 390 based on a sum (i.e., weighted sum) of values obtained by multiplying each of the search index 310, the news index 320, the social media index 330, and vertical media index 360 with the respectively corresponding weight thereof.

Figure 5:
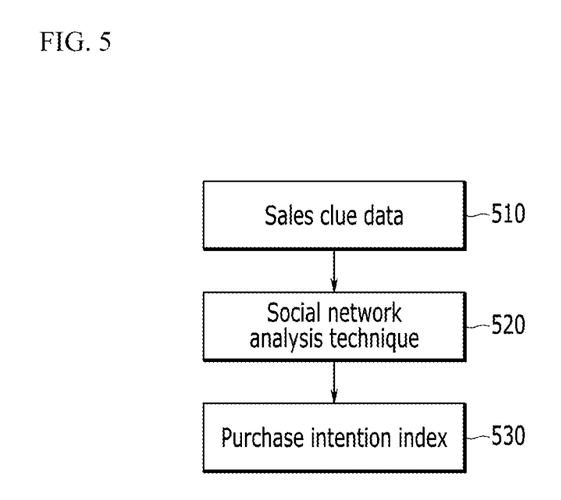
FIG. 5 is a diagram illustrating a process of determining a purchase intention index according to an exemplary embodiment.
Figure 6:
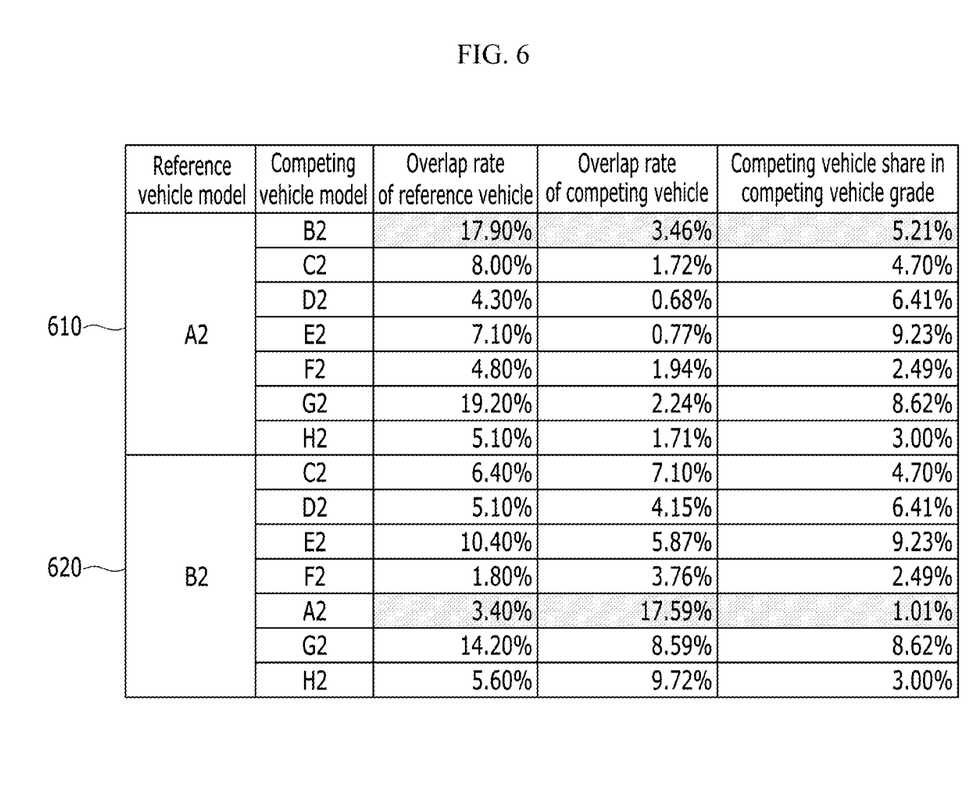
FIG. 6 is a diagram illustrating sales clue data used in a process of determining a purchase intention index shown in FIG. 5.
Figure 7:
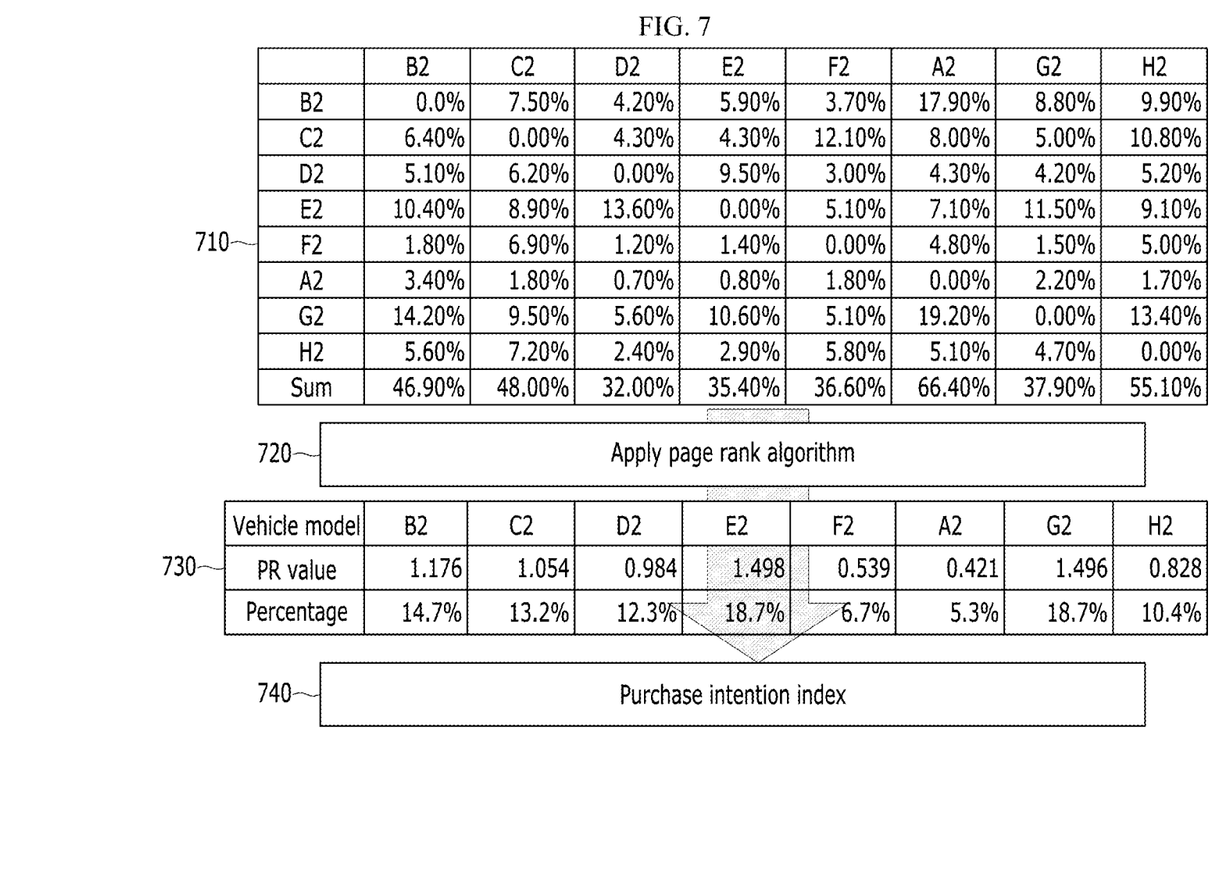
FIG. 7 is a diagram illustrating a process of determining a purchase intention index from sales clue data in a process of determining a purchase intention index shown in 5.

FIG. 5 is a diagram illustrating a process of determining a purchase intention index according to an exemplary embodiment, FIG. 6 is a diagram illustrating sales clue data used in a process of determining a purchase intention index shown in FIG. 5, and FIG. 7 is a diagram illustrating a process of determining a purchase intention index based on sales clue data in a process of determining a purchase intention index shown in 5.

Referring to FIG. 5, a purchase intention index determiner (e.g., 122 in FIG. 1) determines a purchase intention index based on purchase-intended customer group-related data. The purchase intention index determiner may be configured to use sales clue data 510 as the purchase-intended customer group-related data. The sales clue data 510 is data generated from an action that a customer having an intention of purchasing a specific product actively leaves one's own contactable information. The purchase intention index determiner calculates a concurrence rate of the specific product and a competing product based on the sales clue data 510 through a social network analysis technique 520, and then determines the purchase intention index 530 based on the calculated concurrence rate. The concurrence rate represents the number or rate of simultaneously leaving a sales clue by the same customer during a predetermined period.

In some embodiments, as shown in FIG. 6, a purchase intention index determiner may be configured to extract, as a concurrence rate, an overlap rate of a reference product (e.g., an overlap rate of a reference vehicle), an overlap rate of a competing product (e.g., an overlap rate of a competing vehicle), and/or a competing product share (e.g., a competing vehicle share) from sales clue data 610 and 620. The overlap rate of a reference product is an overlap rate between two products in the sales clue data, and indicates a rate of overlapping comparison of the reference product with other competing products. For example, in the sales clue data 610 of a vehicle (e.g., A2), the overlap rate of a reference vehicle indicates a rate of overlapping comparison of the reference vehicle A2 with each of the competing vehicles (e.g., B2, C2, D2, E2, F2, G2, H2, . . . ). In the sales clue data, the overlap rate of a competing product is an overlap rate between two products and indicates a rate of overlapping comparison of the competing product with other competing products. For example, in the sales clue data 610 about vehicle A2, the overlap rate of a competing vehicle represents a rate of overlapping comparison of a competing vehicle (e.g., B2) with the reference vehicle A2. The competing product share is an occupation rate indicating how much sales clue data of a competing product occupies sales clue data of all products of the same grade in the sales clue data. For example, in the sales clue data 610 of a vehicle A2, the competing vehicle share represents an occupation rate of the sales clue of the corresponding competing vehicle B2 among all vehicles of the same grade of each competing vehicle (e.g., B2). Similarly, the sales clue data 620 of another vehicle (e.g., B2) may be configured in the same format.

Referring again to FIG. 5, the purchase intention index determiner may be configured to determine the purchase intention index 530 by applying the social network analysis technique 520 (e.g., page rank algorithm) to the concurrence rate, including an overlap rate of a reference product, an overlap rate of a competing product, and/or a competing product share. In some embodiments, other algorithms used for network analysis in addition to the page rank algorithm may be used as the social network analysis technique 520.

In some embodiments, the purchase intention index determiner may be configured to calculate a sum of rates of overlapping comparisons with the competing product of each product (reference product and competing products), based on the overlap rate of a reference product and the overlap rate of a competing product. The purchase intention index determiner may be configured to calculate a social network value 730 (i.e., page rank (PR) value) of each product by applying a page rank algorithm 720 to the competing product share. The purchase intention index determiner may be configured to determine the purchase intention index 530 of the reference product by considering an importance of the PR value of the reference product in the PR values of all products including the reference product and the competing products. In some embodiments, the purchase intention index determiner may be configured to determine the purchase intention index 740 based on a occupation rate of the PR value of the reference product in the PR value of all products.

According to the above-described embodiment, the positioning index generation apparatus may be configured to generate a positioning index of each step of purchase decision based on interrelationship targeting the entire competitors in a target market, by utilizing data left by customers in a step of product purchase decision.

Next, a positioning index generating method according to an exemplary embodiment will be described.

Figure 8:
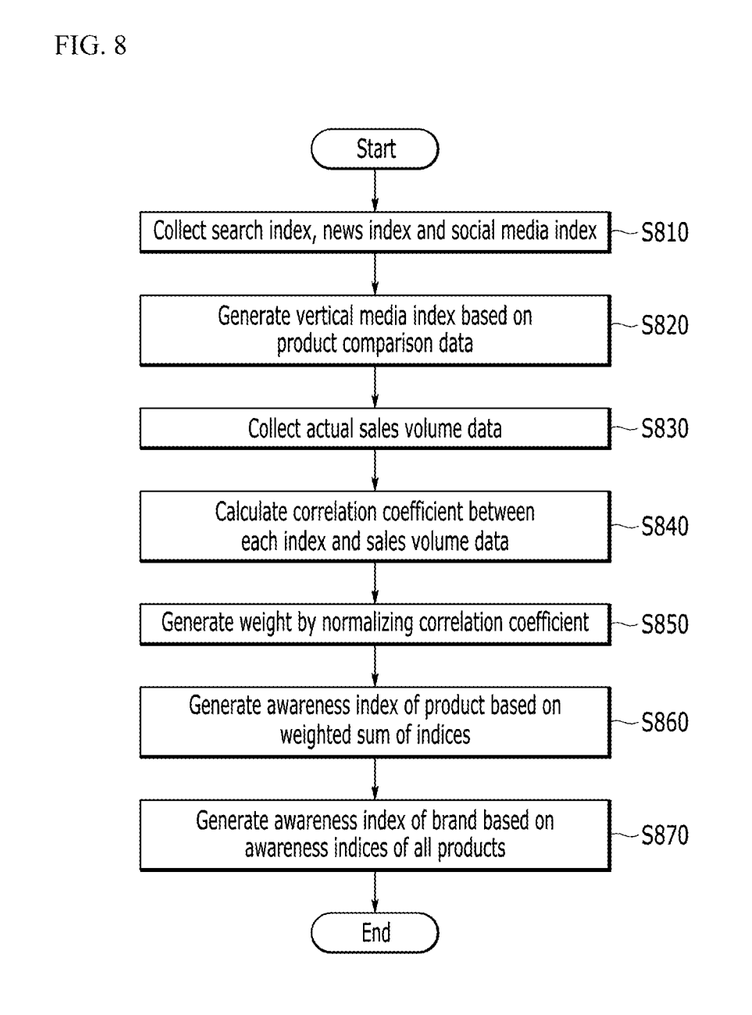
FIG. 8 is a flowchart illustrating a method for generating an awareness index according to an exemplary embodiment.
Figure 9:
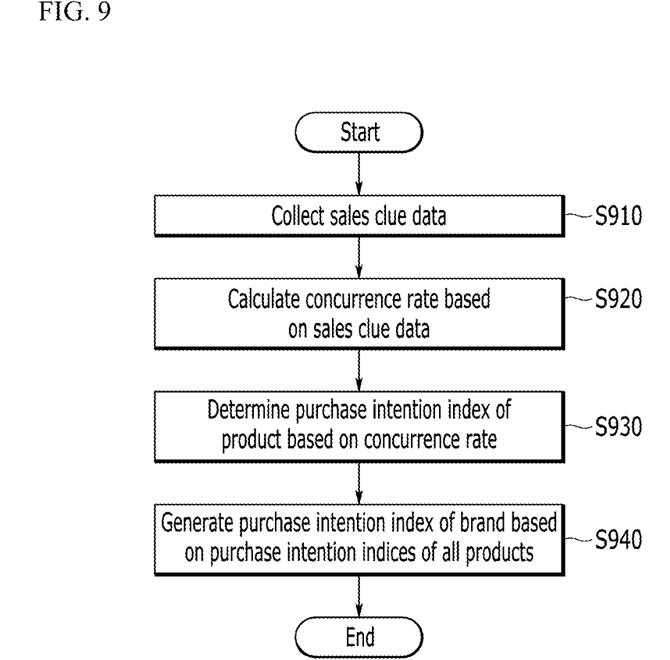
FIG. 9 is a flowchart illustrating a method for generating purchase influence index according to an exemplary embodiment.

FIG. 8 is a flowchart illustrating a method for generating an awareness index according to an exemplary embodiment, and FIG. 9 is a flowchart illustrating a method for generating purchase influence index according to an exemplary embodiment.

Referring to FIG. 8, a positioning index generating apparatus collects digital media indices provided by a plurality of digital media at S810. In some embodiments, the digital media index may comprise a search index, a news index, and/or a social media index. In addition, the positioning index generating apparatus collects product comparison data from a service capable of comparing information on various products, and generates a vertical media index based on the product comparison data at S820. In addition, the positioning index generation apparatus collects actual sales volume data of each product at S830.

The positioning index generation apparatus calculates a correlation coefficient between each index and the sales volume through a correlation analysis technique at S840. In some embodiments, the positioning index generating apparatus may be configured to calculate a correlation coefficient between a search index of each product and the sales volume data of the corresponding product, a correlation coefficient between a news index of each product and the sales volume data of the corresponding product, a correlation coefficient between a social media index of each product and sales volume data of the corresponding product, and a correlation coefficient between a vertical media index of each product and the sales volume data of the corresponding product.

The positioning index generating device generates a weight of each index by normalizing the correlation coefficient of each index at S850. In some embodiments, the positioning index generating device may be configured to normalize the correlation coefficient of each index so that a sum of the correlation coefficients of all indices becomes 1. For example, when the correlation coefficients of the search index, the news index, the social media index, and the vertical media index are 0.62, 0.32, 0.12, and 0.09, respectively, the positioning index generating device may be configured to determine the weights of the search index, the news index, the social media index, and the vertical media index to be 0.54, 0.28, 0.10, and 0.08, respectively.

The positioning index generating device generates an awareness index of the corresponding product by applying the weight to the index of each product at S860. In some embodiments, the positioning index generating device may be configured to calculate the awareness index based on a weighted sum of the indices of each product based on the weights. For example, the positioning index generating device may be configured to calculate the awareness index based on the sum of a product of the search index and 0.54, a product of the news index and 0.28, a product of the social media index and 0.12, and a product of the vertical media index and 0.09. In some embodiments, the positioning index generating device may be configured to normalize the awareness index of a reference product based on awareness indices of all products (e.g., the reference product and all competing products of the reference product) in a target market. For example, the positioning index generating device may be configured to normalize the awareness index of each product so that the sum of the awareness indices of all products in the target market becomes 1. In this case, the normalized awareness index of the reference product may be output as the awareness index of the reference product.

In some embodiments, the positioning index generating device may be configured to generate an awareness index of a corresponding brand based on the awareness indices of all products belonging the same brand at S870. In some embodiments, the positioning index generating apparatus may be configured to determine a sum of the awareness indices of all products belonging to the same brand, as an awareness index of the corresponding brand.

Referring to FIG. 9, the positioning index generating apparatus collects sales clue data from various websites at S910. The positioning index generating apparatus calculates a concurrence rate based on the sales clue data at S920. In some embodiments, the concurrence rate may comprise an overlap rate of reference product, an overlap rate of competing product, and/or a competing product share.

The positioning index generating apparatus determines a purchase intention index of a product by applying a social network analysis technique to the concurrence rate at S930. In some embodiments, the positioning index generating apparatus may be configured to determine an occupation rate of a PR value of the reference product in a PR value of all products (reference product and all competing products)

In some embodiments, the positioning index generating apparatus may be configured to generate a purchase intention index of a corresponding brand based on the purchase intention indices of all products belonging to the same brand at S940. In some embodiments, the positioning index generating apparatus may be configured to determine a value obtained by adding the purchase intention indices of all products belonging to the same brand, as an awareness index of the corresponding brand.

Figure 10:
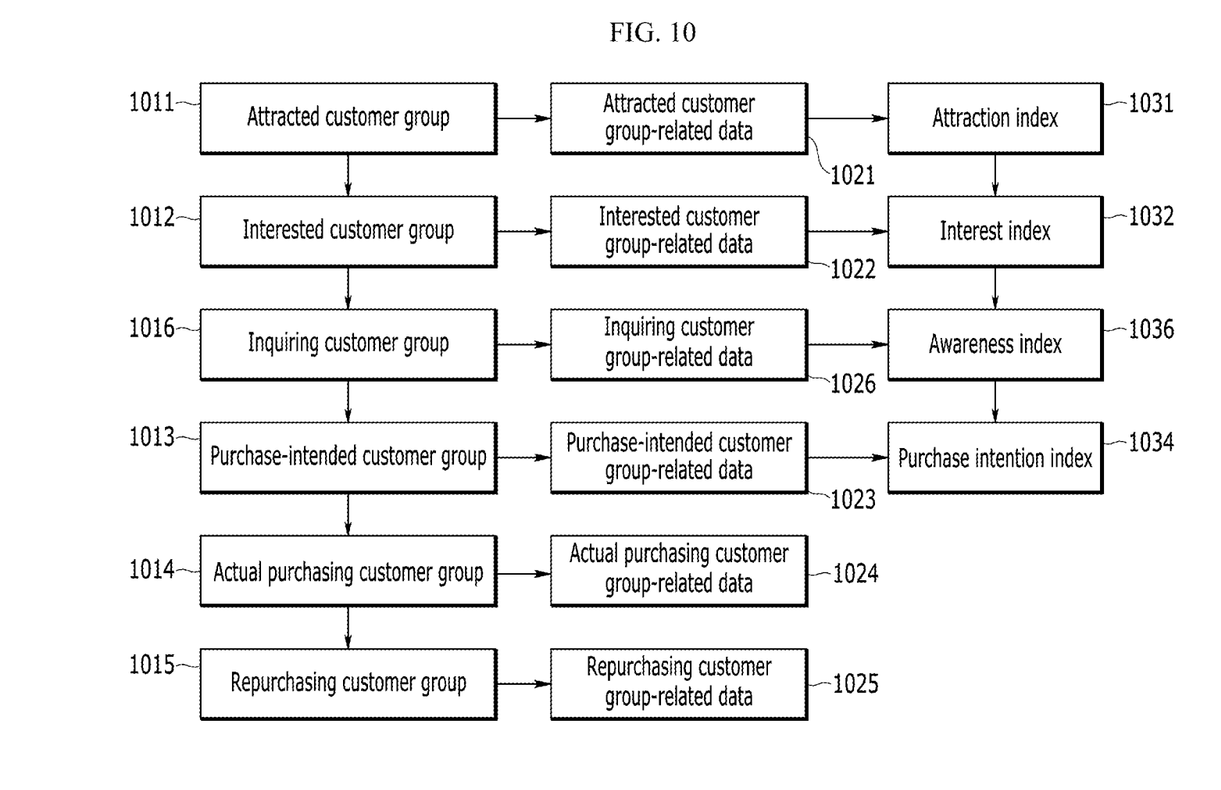
FIG. 10 is a drawing illustrating step-by-step data collection of the positioning index generating device according to another embodiment.

FIG. 10 is a diagram illustrating a data collection at each step of a positioning index generating apparatus according to another embodiment.

Referring to FIG. 10, a step of product purchase decision by a customer may be divided into a step 1011 of recognizing a specific product/brand, a step 1012 of checking detailed information and comparing the product/brand with a competing product, a step 1013 of actively checking a purchase condition for purchasing, a step 1014 of completing a purchase after making a purchase decision, and/or a step 1015 of purchasing additionally/alternatively other product while possessing a product from the same brand, and an additional step. In some embodiments, the additional step may comprise a step 1016 of actively inquiring about the specific product, between an interested customer group and a purchase-intended customer group. The customer group in step 1016 of actively inquiring about the specific product may be referred to as an inquiring customer group. In some embodiments, the additional step may further comprise another step, for example advocating the specific product (advocating customer group).

In some embodiments, an index determiner (e.g., 121 in FIG. 1) may be configured to reflect data (inquiring customer group-related data) generated from an action of actively inquiring about the specific product when determining the positioning index. For example, the index determiner may be configured to determine the awareness index based on attracted customer group-related data, interested customer group-related data, and inquiring customer group-related data.

In some embodiments, the index determiner may be configured to determine a positioning index corresponding to each step. For example, the index determiner may be configured to determine an attraction index 1031 based on the attracted customer group-related data 1021, may be configured to determine an interest index 1032 based on the interested customer group-related data 1022, may be configured to determine the awareness index 1036 based on the inquiring customer group-related data 1026, and may be configured to determine a purchase intention index 1034 based on purchase-intended customer group-related data 1024. In some embodiments, the index determiner may be configured to determine an additional index based on the data 1021 to 1026. For example, the index determiner may be configured to determine a loyalty index based on repurchasing customer group-related data or advocating customer group related-data.

In some embodiments, the index determiner may be configured to determine one positioning index based on data generated in two or more steps. For example, the index determiner may be configured to determine one positioning index by merging two or more similar steps. In some embodiments, the index determiner may be configured to determine two or more positioning indices based on data generated in one step. For example, the index determiner may be configured to subdivide one step, and determine a positioning index corresponding to the subdivided step based on data defining a characteristic of the subdivided step.

As described above, according to some embodiments, utilizing data generated from various actions up to purchasing a product allows overcoming drawbacks (e.g. the number of survey samples is small, a possibility that answers of survey participants are limited or biased to a directionality).

In some embodiments, by subdividing actions up to purchasing into steps and generating measureable indices for each step, a value of the most appropriate index for an application field may be set as a key performance indicator (KPI). For example, in a promotion/marketing sector, the "awareness index", which means customer awareness of a brand or a product, may be set as the KPI for measuring post-event effectiveness, and in a sales sector, the "purchase intention index" generated based on sales clue data directly related to sales may be set as the KPI.

As in the past, if an arithmetic assessment method based on a volume of related data is used for deriving a value for estimating a ranking of a product or brand in a target market, there may be many cases where accurately measuring a position of the corresponding product or brand is impossible due to intentional distortion of the volume or volume distortion caused by gossipy contents. In some embodiments, the position of the corresponding product or brand may be accurately measured by quantifying a relationship of a specific product or brand and calculating the importance thereof in a target market based on the quantified relationship.

Next, an exemplary positioning index generating apparatus or a computing device that can implement a positioning index generating method according to an exemplary embodiment of the present disclosure is described with reference to FIG. 11.

Figure 11:
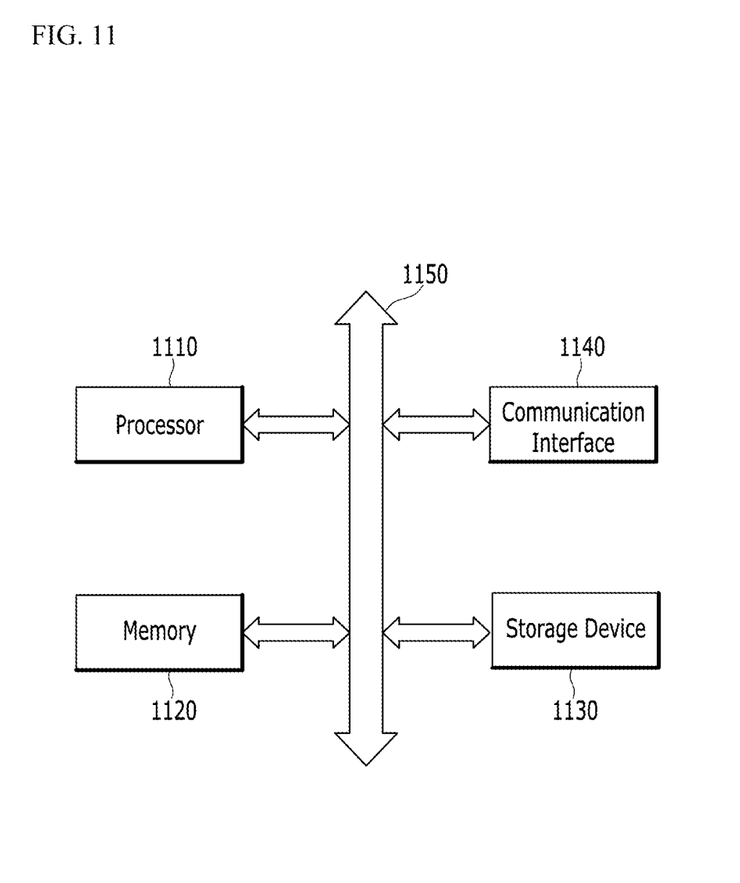
FIG. 11 is a block diagram illustrating a positioning index generating apparatus according to an exemplary embodiment.

FIG. 11 is a block diagram illustrating a positioning index generating apparatus according to an exemplary embodiment.

Referring to FIG. 11, a computing device, or a positioning index generating apparatus, comprises a processor 1110, a memory 1120, a storage device 1130, a communication interface 1140, and a bus 1150. The computing device may further comprise other general components.

The processor 1110 controls overall operation of each component of the computing device. The processor 1110 may be implemented with at least one of various processing unit such as a central processing unit (CPU), a microprocessor unit (MPU), a micro controller unit (MCU), and a graphic processing unit (GPU), and may be implemented with a parallel processing unit. Also, the processor 1110 may be configured to perform an operation on a program for executing the above-described positioning index generating method.

The memory 1120 stores various data, instructions and/or information. The memory 1120 may be configured to load a computer program from the storage device 1130 to execute the positioning index generating method. The storage device 1130 may be configured to non-temporarily store a program. The storage device 1130 may be implemented with a non-volatile memory. The storage device 1130 may be configured to store the above-described database.

The communication interface 1140 supports wired/wireless Internet communication of the computing device. In addition, the communication interface 1140 may be configured to support various communication methods other than Internet communication. The computing device may be configured to communicate with a user terminal and a vehicle terminal via the communication interface 1140.

The bus 1150 provides a communication function between components of the computing device. The bus 1150 may be implemented with various types of buses, such as an address bus, a data bus, and a control bus.

The computer program may comprise instructions that cause the processor 1110 execute the positioning index generating method when loaded onto the memory 1120. That is, the processor 1110 may be configured to perform an operation for positioning index generating method by executing instructions.

In some embodiments, a positioning index generating method may be implemented as a computer-readable computer program on a computer-readable medium. In one embodiment, a computer-readable medium may be a removable recording medium or a fixed recording medium. In another embodiment, a computer program recorded on a computer-readable medium may be transmitted to another computing device via a network such as Internet, installed in another computing device, and then may be executed.

In some embodiments, to implement the positioning index generating method, the computer program may comprise instructions to execute collecting data generated by an action of a customer in each of the plurality of steps into which a product purchase decision step is divided, and determining a positioning index of a product based on data generated in at least one step among the plurality of steps.

In some embodiments, to implement the positioning index generating method, the computer program may comprise instructions to execute collecting data generated by an action of a customer in each step of a product purchase decision, and determining a positioning index of a product based on at least some data among the collected data.

While the present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

What is claimed is:

1. A method of generating a positioning index executed by a computing device, the method comprising:
    providing a processor operably connected to a memory that stores instructions, the processor configured to execute the instructions causing the processor to:
    collect data, generated by an action of a customer, in each of a plurality of steps into which a product purchase decision step is divided;
    determine a vertical media index of the product based on a weight of a product;
    determine a positioning index of the product based on data generated in at least one step among the plurality of steps, the positioning index comprising an awareness index; and
    output the awareness index as a measure of an importance of the product in a target market,
    wherein the data generated in the at least one step comprises:
        a digital media index of the product; and
        product comparison data for the product,
    wherein the digital media index comprises one or more of the following:
        a search index;
        a news index of the product; and
        a social media index of the product,
    wherein the product comparison data comprises a number of comparisons or a comparison rate between the product and each of one or more competing products during a predetermined period, and
    wherein determining the positioning index comprises determining the weight of the product based on the product comparison data.

2. The method of claim 1, further comprising, based on positioning indices of a plurality of products belonging to one brand, determining a positioning index of the brand.

3. The method of claim 1, wherein the data generated in the at least one step comprises:
    data generated by an action of an attracted customer group of the product; and
    data generated by an action of an interested customer group of the product.

4. The method of claim 1, wherein determining the weight of the product further comprises determining the weight of the product based on the number of comparisons or the comparison rate through a social network analysis technique.

5. The method of claim 1, wherein determining the positioning index further comprises:
    calculating a correlation coefficient between an actual sales volume of the product and each of a plurality of indices comprising the digital media index and the vertical media index;
    setting a weight of each of the plurality of indices based on the correlation coefficient; and
    determining the awareness index of the product based on a weighted sum of the plurality of indices calculated based on the weight.

6. The method of claim 5, wherein setting the weight further comprises setting the weight of each of the plurality of indices by normalizing the correlation coefficient of each of the plurality of indices.

7. The method of claim 5, wherein determining the awareness index of the product further comprises normalizing the awareness index of the product so that a sum of the awareness index of the product and awareness indices of a plurality of competing products becomes one.

8. The method of claim 1, wherein:
    the data generated in the at least one step comprises data generated by an action of a purchase-intended customer group of the product, and
    the positioning index comprises a purchase intention index.

9. The method of claim 8, wherein:
    the data generated in the at least one step comprises sales clue data generated from an action of leaving contactable information by the purchase-intended customer group of the product, and
    determining the positioning index further comprises:
        calculating a concurrence rate of the product and a competing product from the sales clue data, and determining the purchase intention index of the product based on the concurrence rate.

10. The method of claim 9, wherein the concurrence rate comprises one or more of the following:
a rate of overlapping comparison of the product with the competing product;
a rate of overlapping comparison of the competing product with the product; and
an occupation rate of the sales clue data of the competing product in sales clue data of a plurality of products of a same grade among the sales clue data.

11. The method of claim 9, wherein determining the purchase intention index further comprises determining the purchase intention index based on the concurrence rate through a social network analysis technique.

12. The method of claim 11, wherein determining the purchase intention index further comprises:
determining a social network value of the product based on the concurrence rate through the social network analysis technique;
determining a social network value of the competing product through the social network analysis technique; and
determining the purchase intention index based on an occupation rate of the social network value of the product in the social network value of the product and the social network value of the competing product.

13. The method of claim 1, wherein:
the data generated in the at least one step comprises first data generated by an action of a customer group in a first step, and second data generated by an action of a customer group in a second step different from the first step, and
the positioning index comprises a first index generated based on the first data and a second index generated based on the second data.

14. An apparatus for generating a positioning index, comprising:
a memory configured to store one or more instructions; and
a processor configured to, by executing the one or more instructions:
collect data generated by an action of a customer group in each step of a product purchase decision;
determine a vertical media index of a product based on a weight of the product;
determine a positioning index based on at least some data of the data, the positioning index comprising an awareness index; and
output the awareness index as a measure of an importance of the product in a target market,
wherein the at least some data comprises:
a digital media index of the product; and
product comparison data for the product,
wherein the digital media index comprises one or more of the following:
a search index;
a news index of the product; and
a social media index of the product, and
wherein the product comparison data comprises a number of comparisons or a comparison rate between the product and each of one or more competing products during a predetermined period, and
wherein determining the positioning index comprises determining the weight of the product based on the product comparison data.

15. The apparatus of claim 14, wherein:
the at least some data comprises first data generated by an action of an attracted customer group of a product and second data generated by an action of an interested customer group of the product, and
the processor is further configured to determine the awareness index of the product based on the at least some data.

16. The apparatus of claim 14, wherein:
the at least some data comprises data generated by an action of a purchase-intended customer group of a product,
the processor is further configured to determine a purchase intention index of the product based on the at least some data, and
the positioning index comprises the purchase intention index.

17. The apparatus of claim 14, wherein the at least some data comprises:
first data generated by an action of an attracted customer group of a product;
second data generated by an action of an interested customer group of the product; and
third data generated by an action of a purchase-intended customer group of the product,
wherein the processor is further configured to:
determine the awareness index of the product based on the first data and the second data; and
determine a purchase intention index of the product based on the third data, and
wherein the positioning index comprises the awareness index and the purchase intention index.

18. A computer program executed by a computing device and stored on a non-transitory storage medium, the computer program causing the computing device to execute:
collecting data generated by an action of a customer in each of a plurality of steps into which a product purchase decision step is divided;
determining a vertical media index of a product based on a weight of the product;
determining a positioning index based on data generated in at least one step of the plurality of steps, the positioning index comprising an awareness index; and
outputting the awareness index as a measure of an importance of the product in a target market,
wherein the data generated in the at least one step comprises:
a digital media index of the product; and
product comparison data for the product,
wherein the digital media index comprises one or more of the following:
a search index;
a news index of the product; and
a social media index of the product, and
wherein the product comparison data comprises a number of comparisons or a comparison rate between the product and each of one or more competing products during a predetermined period, and
wherein determining the positioning index comprises determining the weight of the product based on the product comparison data.

* * * * *